United States Patent [19]

Yamazaki et al.

[11] 4,302,780
[45] Nov. 24, 1981

[54] PHOTOMETRIC SYSTEM

[75] Inventors: Masafumi Yamazaki, Okaya; Shuichi Takayama, Hachioji; Kosaku Tsuboshima, Hachioji; Yoshio Nakajima, Hachioji; Teruo Iwasawa, Mitaka, all of Japan

[73] Assignee: Olympus Optical Company Limited, Tokyo, Japan

[21] Appl. No.: 90,082

[22] Filed: Oct. 31, 1979

[30] Foreign Application Priority Data

Nov. 1, 1978 [JP] Japan ................................ 53-133760

[51] Int. Cl.³ .......................... H04N 5/26; G03B 7/08
[52] U.S. Cl. ..................................... 358/228; 354/43
[58] Field of Search ............... 358/225, 228, 212, 213; 354/28–31, 36–38, 43

[56] References Cited

U.S. PATENT DOCUMENTS 4,037,254 7/1977 Monahan ............................ 358/228

Primary Examiner—John C. Martin
Attorney, Agent, or Firm—Haseltine and Lake

[57] ABSTRACT

A photometric system for use in an image pick-up device is disclosed. The photometric system comprises the steps of forming an image focussed by a camera lens system on a light receiver consisting of a plurality of charge transfer elements arranged in a picture element array; selectively deriving luminance signals of amplitude having a value within a range of about ±2 exposure values around a reference exposure value corresponding to a mean value between a maximum value and a minimum value of the amplitude of the luminance signals; and seeking a mean value of the selected luminance signals to photometrically measure the light of automatically selected portions on the average.

8 Claims, 1 Drawing Figure

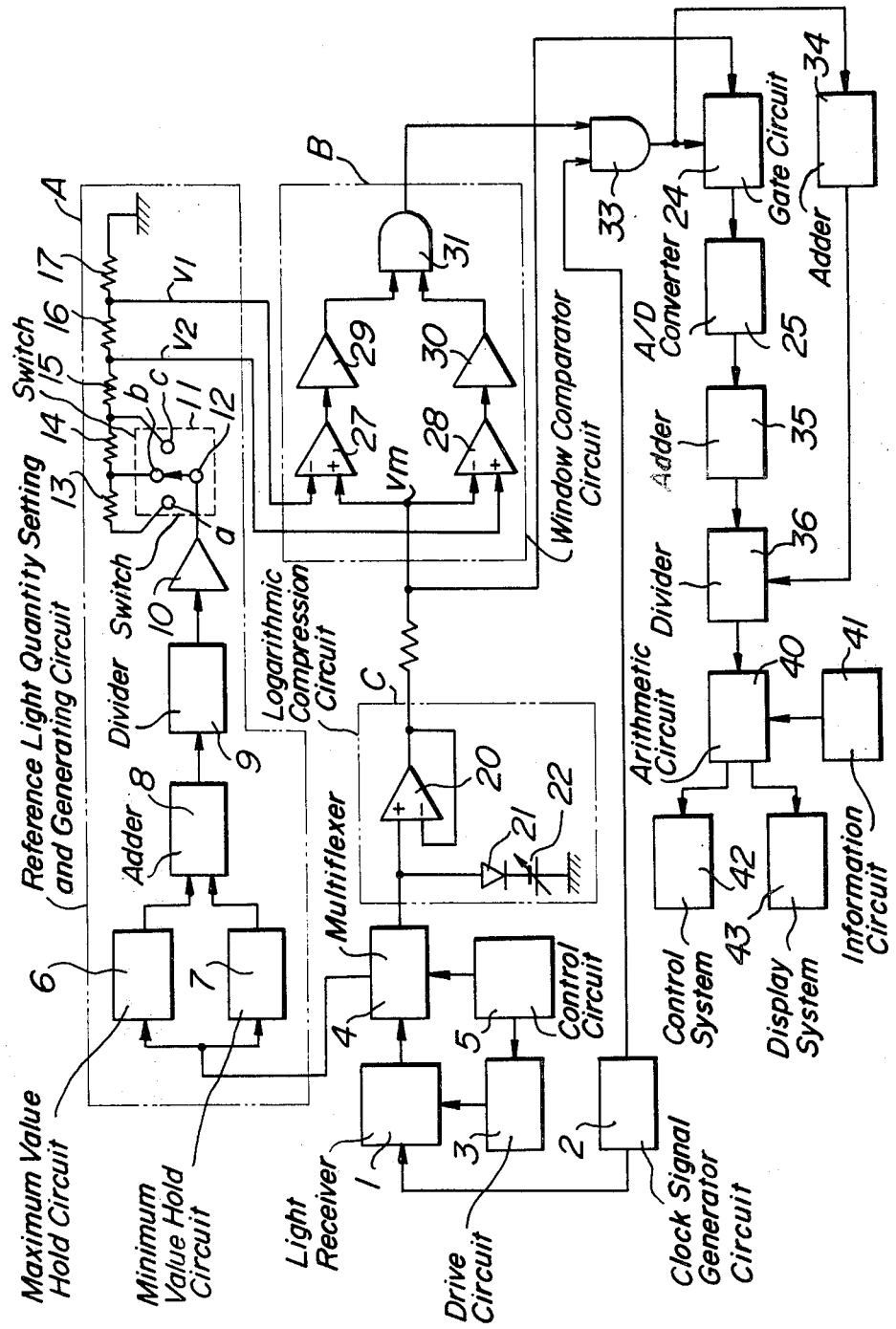

PHOTOMETRIC SYSTEM

BACKGROUND OF THE INVENTION

The present invention relates to a photometric system applied to an image pick-up device such as a still camera, a moving camera, a television camera, an industrial television camera and the like.

In case of photographing an object by a camera, it has often occurred that the object becomes too dark with rear light or the object becomes too bright when photographing at night. As a photometric system for eliminating such conventional disadvantage, Japanese Patent Laid-open No. 129,221/75 discloses such system that provision is made of a light receiver having a number of light-receiving elements consisting of an image sensor such as CCD (charge coupled device) or the like for receiving light present on the whole surface of the field of an object, thereby deriving a luminance signal of a previously selected necessary photometric portion among luminance signals corresponding to positions of an object successively obtained from the light receiver and carrying out spot photometry. Such photometric system, however, requires to designate a photometric portion, so that its operation is troublesome, and it is necessary to derive a luminance signal corresponding to respective photometric portions, so that its circuit construction becomes complicated and large. In case of photographing a moving object, it is difficult to correspond the object to a desired photometric portion, so that it is almost impossible to carry out precise spot photometry.

SUMMARY OF THE INVENTION

An object of the present invention is to eliminate the above described disadvantages of the conventional photometric system.

Another object of the present invention is to provide a photometric system capable of obtaining a desired light quantity with a simple construction.

A further object of the present invention is to provide a photometric system capable of constantly obtaining a proper light quantity in usual daytime photographing.

According to the present invention a photometric system comprises steps of forming an image focussed by a photo-optical system on a light receiver consisting of a plurality of charge transfer elements arranged in a picture element array; selectively deriving luminance signals of amplitude having a value within a range of a predetermined exposure value from luminance signals provided by the light receiver around a reference exposure value corresponding to a mean value between a maximum value and a minimum value of the amplitude of the luminance signals; and seeking a mean value of the selected luminance signals to photometrically measure the light of automatically selected portions on the average. A photometric system comprises the steps of forming an image focussed by a camera lens system on a light receiver consisting of a plurality of charge transfer elements arranged in a picture element array; selectively deriving luminance signals of amplitude having a value within a range of about ±2 exposure values around a reference exposure value corresponding to a mean value between a maximum value and a minimum value of the amplitude of the luminance signals; and seeking a mean value of the selected luminance signals to photometrically measure the light of automatically selected portions on the average. The reference exposure value corresponding to the mean value between the maximum value and the minimum value of the amplitude of the luminance signals can be varied within a range of about ±1 exposure value.

A photometric apparatus for use in an image pick-up device comprises a light receiver arranged at a focal plane of a camera lens optical system for receiving an image focussed by the camera lens optical system; a reference light quantity setting and generating circuit connected to the light receiver for generating a reference light quantity by obtaining a mean value between a maximum value and a minimum value of the amplitude of the luminance signals from the light receiver; a logarithmic compression circuit connected to the light receiver for logarithmically compressing the luminance signals from the receiver; a window comparator circuit connected to the logarithmic compression circuit and the reference light quantity setting and generating circuit for selecting luminance signals of amplitude having a value within a range of predetermined exposure value; a signal treating circuit connected to the window comparator circuit and the logarithmic compression circuit for treating the signals from the these circuits to obtain an average value of the amplitude of the luminance signals to the reference light quantity set in the reference light quantity setting and generating circuit; an information circuit for generating signals of exposure factors; an arithmetic circuit connected to the signal treating circuit and the information circuit for calculating the mean value output of the signal treating circuit and the exposure factors of the information circuit; a control device connected to the arithmetic circuit for controlling the shutter speed and the iris of the image pick-up device; and a display device connected to the arithmetic circuit for displaying the shutter speed value and the iris value of the image pick-up device. The light receiver comprises a plurality of light receiving elements consisting of an image sensor. The image sensor consists of a charge coupled device or a bucket brigade device. The reference light quantity setting and generating circuit comprises a rotary switch having three terminals, and these terminals are so switched that a proper light quantity for a daytime, a nighttime and a rear light photographing can be obtained.

As described above, the invention is to derive a luminance signal of an amplitude within the range of a predetermined exposure value and photometrically measure it on the average around a reference exposure value corresponding to a mean value between the maximum value and the minimum value of the luminance signal obtained from a light receiver.

The present inventors have confirmed from various experiments in usual daytime photographing what a good photograph can be obtained by how to set the range of the exposure value around a reference exposure value and found out that the range of about ±2 EV is proper.

BRIEF DESCRIPTION OF THE DRAWING

A single FIGURE is a circuit diagram showing one embodiment of a photometric system according to the present invention.

DETAILED DESCRIPTION OF THE INVENTION

Referring now to the drawing one embodiment of a photometric system according to the present invention will be described. In the present embodiment the case of applying the invention to a camera is explained.

A light receiver 1 is arranged to receive an image focussed on a focal plane of a camera lens which is not illustrated. The light receiver comprises a number of light-receiving elements (hereinafter referred to as picture element) consisting of image sensors such as CCD, BBD (bucket brigade device) or the like. The light receiver 1 receives predetermined signals from a clock signal generator 2 and a drive circuit 3 and successively supplies luminance signals of each picture element to a multiplexer 4. The drive circuit 3 and the multiplexer 4 are controlled by signals from a control circuit 5. The successive luminance signals in the first one frame of the light receiver 1 are supplied to a reference light quantity setting and generating circuit A through the multiplexer 4.

The reference light quantity setting and generating circuit A sets a voltage for selecting a luminance signal of an amplitude having a value within a predetermined range at a window comparator circuit B which will be explained later on, based on a mean value (reference light quantity) between the maximum value and the minimum value of the amplitude of the input luminance signal as a reference. To this end, the maximum value and the minimum value of the amplitude of the luminance signal applied through the multiplexer 4 are detected by a maximum value hold circuit 6 and a minimum value hold circuit 7, respectively, these maximum and minimum values are added by an adder 8, its mean value is sought by a divider 9, and a voltage corresponding to the mean value is delivered to an input terminal 12 of a switch 11 through an amplifier 10. The switch 11 comprises three switch contacts a, b and c, in which the contact a is grounded through resistors 13, 14, 15, 16 and 17 having predetermined resistance values, respectively, the contact b is connected to a junction point of the resistors 13 and 14, and the contact c is connected to a junction point of the resistors 14 and 15, respectively. A junction point of the resistors 16 and 17 and that of the resistors 15 and 16 are connected to two reference input terminals, respectively, at the window comparator circuit B, to supply reference voltages $V_1$ and $V_2$ for selectively deriving a luminance signal having an amplitude within a predetermined range based on the mean value as a reference.

In the present embodiment, when the terminal 12 of the switch 11 is connected to the contact b, a reference exposure value corresponding to the mean value is obtained, and when the terminal 12 is connected to the contact a or c, the reference exposure value is varied by ±1 EV (exposure value), and the reference voltages $V_1$ and $V_2$ are of values for deriving a luminance signal having an amplitude within the range of about ±2 EV around the exposure value at the connection of the switch 11 to the contacts.

The above described reference voltages $V_1$ and $V_2$ are set by scanning the light receiver 1 by one frame.

When the one frame scanning of the light receiver 1 is completed and the next scanning is started by the drive circuit 3 under control of the control circuit 5, the luminance signal at that time is supplied to a logarithmic compression circuit C through the multiplexer 4. This logarithmic compression circuit C comprises an operational amplifier 20, a diode 21 having a logarithmic characteristic and a variable voltage supply source 22, so as to connect a positive input terminal of the operational amplifier 20 to an output terminal of the multiplexer 4, to ground through the diode 21 connected in forward direction and the variable voltage supply source 22 or to connect a negative input terminal to an output terminal of the operational amplifier 20 and to supply a logarithmic compressed luminance signal as an output signal. This output signal is supplied to the window comparator circuit B and also to an A/D converter 25 through a gate circuit 24.

The window comparator circuit B comprises comparators 27, 28, amplifiers 29, 30 and an AND gate 31, so as to supply the above described two reference voltages $V_1$, $V_2$ to one input terminal of the comparators 27 and 28, and to supply output signals of the logarithmic compression circuit C to the other input terminal of the comparators, respectively. The outputs of the comparators 27 and 28 are amplified to predetermined values in accordance with the outputs by respective amplifiers 29 and 30 and supplied to the AND circuit 31. The AND circuit 31 supplies a digital signal of a high level only when two input signals are in high level, that is, the output voltage $V_m$ of the logarithmic compression circuit C has a relation of $V_1 < V_m < V_2$.

The gate circuit 24 is controlled by the output of the window comparator circuit B and the output of the AND circuit 33 which receives a clock signal from the clock signal generator circuit 2, and supplies the output of the logarithmic compression circuit C to the A/D converter 25 by opening the gate 24 when the output of the AND circuit 33 is in high level. Further, the number of delivers for the digital signals of high level in one frame, that is, the number of picture elements in the logarithmically compressed luminance signals having the amplitude $V_m$ within a range of $V_1 < V_m < V_2$ are counted by an adder 34.

The output of the logarithmic compression circuit C supplied to the A/D converter 25 is converted into a train of pulses having its number in accordance with the amplitude of the output and the output of the converter 25 is supplied to an adder 35. The adder 35 adds all the pulse numbers of the outputs of the logarithmic compression circuit C supplied to the A/D converter 25 in one frame and supplies the result thereof to a divider 36. The divider 36 divides the output of the adder 35 by the counted value of the adder 34. Therefore, the output of the divider 36 becomes a digital mean value of the luminance signal of an amplitude having a value within the range of about ±2 EV around a reference light quantity set by the reference light quantity setting and generating circuit A.

An arithmetic circuit 40 operationally treats the mean value output from the divider 36 together with exposure factors such as a shutter speed value, an iris value, an ASA sensitivity or the like supplied from an information circuit 41, controls a control system 42 of the shutter speed and the iris based on the result thereof and indicates these values in a display system 43.

According to the above described embodiment, if the contact b is connected to the terminal 12 of the switch 11 provided in the reference light quantity setting and generating circuit A, the luminance signal of an amplitude having a value within the range of about ±2 EV is automatically selected around the reference exposure value corresponding to the mean value between the maximum value and the minimum value of the amplitude of the luminance signals from the light receiver 1, that is, the field portion within the range of about ±2 EV is automatically selected, and the thus selected portion is photometrically measured on the average, so that a precise light quantity can always be obtained in usual daytime photographing. In case of obtaining a proper light quantity at a bright portion or a dark portion, that is, in the nighttime photographing or rear light photographing, a desired light quantity can be obtained by only connecting the terminal 12 of the switch 11 to the contact c or a.

As stated above in detail, according to the present invention, the photometric portion is automatically selected and the proper light quantity can be obtained, so that there is not required any troublesome operation for selecting a photometric portion as in the conventional system, the circuit construction becomes simple and small, and even in such a case that a moving object is photographed, a desired light quantity can easily be obtained.

In addition, the invention is not limited to the above embodiment, but can be modified or altered in various ways. For example, if the resistors 13 and 14 connected between the contact a of the switch 11 in the reference light quantity setting and generating circuit A and the ground in series are replaced by a variable resistor, the reference exposure value can optionally be changed within the range of ±1 EV or more than that. Further, it is preferable to form an image focussed by a camera lens optical system on the light receiver 1, if an image focussed on a focal plane is guided by an optical fiber or the like, the light receiver can be set at any optional position. In the above embodiment, the photometry is carried out by arithmetic mean, but it can be possible to construct it by seeking geometric mean, harmonic mean, square mean, median or the like. Further, in the above embodiment, the luminance signal at the selected portion was A/D converted to obtain a mean value, but it can be possible to obtain a mean value with an analog signal as it is, or the whole circuit is made as a digital circuit to photometrically measure the selected portion on the average.

What is claimed is:

1. A photometric method comprising the steps of: forming an image focussed by a photo-optical system on a light receiver consisting of a plurality of charge transfer elements arranged in a picture element array; selectively deriving luminance signals of amplitude having a value within a range of a predetermined exposure value from luminance signals provided by the light receiver around a reference exposure value corresponding to a mean value between a maximum value and a minimum value of the amplitude of the luminance signals; and seeking a mean value of the selected luminance signals to photometrically measure the light of automatically selected portions on the average.

2. A photometric method comprising the steps of: forming an image focussed by a camera lens system on a light receiver consisting of a plurality of charge transfer elements arranged in a picture element array; selectively deriving luminance signals of amplitude having a value within a range of about ±2 exposure values around a reference exposure value corresponding to a mean value between a maximum value and a minimum value of the amplitude of the luminance signals; and seeking a mean value of the selected luminance signals to photometrically measure the light of automatically selected portions on the average.

3. A photometric method as claimed in claim 2, wherein the reference exposure value corresponding to the mean value between the maximum value and the minimum value of the amplitude of the luminance signals can be varied within a range of about ±1 exposure value.

4. A photometric apparatus for use in an image pick-up device comprising a light receiver arranged at a focal plane of a camera lens optical system for receiving an image focussed by the camera lens optical system; a reference light quantity setting and generating circuit connected to the light receiver for generating a reference light quantity by obtaining a mean value between a maximum value and a minimum value of the amplitude of the luminance signals from the light receiver; a logarithmic compression circuit connected to the light receiver for logarithmically compressing the luminance signals from the receiver; a window comparator circuit connected to the logarithmic compression circuit and the reference light quantity setting and generating circuit for selecting luminance signals of amplitude having a value within a range of predetermined exposure value; a signal treating circuit connected to the window comparator circuit and the logarithmic compression circuit for treating the signals from these circuits to obtain an average value of the amplitude of the luminance signals selected by said window comparator circuit in relation to the reference light quantity set in the reference light quantity setting and generating circuit; an information circuit for generating signals of exposure factors; an arithmetic circuit connected to the signal treating circuit and the information circuit for calculating the mean value output of the signal treating circuit and the exposure factors of the information circuit; a control device connected to the arithmetic circuit for controlling the shutter speed and the iris of the image pick-up device; and a display device connected to the arithmetic circuit for displaying the shutter speed value and the iris value of the image pick-up device.

5. A photometric apparatus as claimed in claim 4, wherein the light receiver comprises a plurality of light receiving elements consisting of an image sensor.

6. A photometric apparatus as claimed in claim 5, wherein the image sensor consists of a charge coupled device.

7. A photometric apparatus as claimed in claim 5, wherein the image sensor consists of a bucket brigade device.

8. A photometric apparatus as claimed in claim 4, wherein the reference light quantity setting and generating circuit comprises a rotary switch having three terminals, and these terminals are so switched that a proper light quantity for a daytime, a nighttime and a rear light photographing can be obtained.

* * * * *